Patented Nov. 25, 1952

2,619,422

UNITED STATES PATENT OFFICE 2,619,422

DESSERT MIX AND METHOD OF MAKING THE SAME

Holton W. Diamond, Whiting, Ind.

No Drawing. Application March 23, 1950,
Serial No. 151,546

16 Claims. (Cl. 99—139)

This invention relates to a food product and method of making the same and more particularly to a food product in the class of dessert mixes. It relates more particularly to a dessert mix which resembles, in its liquid, dried, and concentrate forms, respectively, the liquid, dried, and concentrate forms of an ice cream mix. It relates further to a dessert mix which is adapted, in its liquid, dried, and concentrate forms, respectively, to be frozen with aeration, reconstituted and frozen with aeration, or diluted and frozen with aeration, in all of which forms it has controllable and predictable performance characteristics.

It has long been known that proteins, carbohydrates and fats, of either animal or vegetable origin, or both, can be used with water to form emulsions which can be aerated and frozen, and that such emulsions often resemble in some considerable degree, the conventional ice cream mix made by adding sugar and other ingredients to cream, the naturally occurring emulsion. The experience of purchasing whipping cream which fails to whip is so common an experience as to be known to every housewife, and the defect of nature which is manifested by the cream which fails to whip is often carried over into the ice cream mix in which the cream is used.

Prior to the present invention, both ice cream mixes and the food emulsions made to resemble them were subject to considerable variations in performance upon aeration and freezing.

In general, the prior art which relates to the preparation of such emulsions teaches the use of various homogenization procedures and many different emulsifying and stabilizing agents to improve the performance of the raw materials offered by nature, to obtain better emulsification, smoother texture, etc., in the finished product. The prior art does not disclose an understanding of the true nature of the physico-chemical phenomena involved in the simultaneous aeration and chilling of dessert mix emulsions, and does not disclose any way in which these phenomena can be controlled with predictable certainty.

An object of this invention is to produce a dessert mix having predictable, controllable, and uniform performance characteristics and in which each ingredient performs a definite and highly specific function, which function is subject to laboratory control at the time of manufacture of the mix.

A further object of this invention is to produce a dessert mix of high quality which can be manufactured at a relatively low cost.

Another object of the invention is to provide a dessert mix product which may be packaged in either the liquid, concentrate or dried forms and in which the resulting aerated dessert product has good body and excellent texture and overrun characteristics.

Still another object is to provide a dessert mix in concentrate or dried forms which may be reconstituted with water and whipped, aerated and frozen without any appreciable "aging" after reconstitution.

Other objects of the invention will appear in the following description and appended claims. Before explaining the present invention in detail, it is to be understood that the invention is capable of other embodiments and of being practiced or carried out in various ways. It is also to be understood that the phraseology or terminology employed herein is for the purpose of description and not of limitation.

I have discovered that a frozen dessert of the ice cream type can be produced with acceptable body, texture, and overrun characteristics by effecting a partial reversal of the phases of the dessert mix emulsion during aeration and chilling. In this process of partial phase reversal, a number of internal lattices of cohering solid fat globules are formed in the emulsion, and aid in the entrapment and retention of air ingested by the proteinaceous foam forming components of the emulsion during the whipping and chilling of the mix.

I have also discovered a broad principle in emulsion technology; namely, that a deliberate and precisely controlled reversal of phases can be brought about in an emulsion by the use of specific and definite amounts of a lipophilic additive or stabilizer comprising the mixed partial glyceride reaction product of the metathetical reaction of glycerin and whole fats or oils when this reagent is used in the definite amounts and ranges and mixed in the manner to give a desired state of equilibrium hereinafter specified and claimed. The stabilizer and the melted fat phase of the emulsion should be mixed before the two phases are dispersed by homogenization.

This invention is concerned not with this broad principle per se, but with its employment in a definite and specific application, namely, the production of a dessert mix which will produce an aerated dessert product having controllable and predictable characteristics. A table of these operative amounts in percentages by weight which will give an aerated dessert mix having these characteristics is as follows:

| Material | Liquid | | Concentrate | | Dry | |
|---|---|---|---|---|---|---|
| | Range, percent | Preferred, percent | Range, percent | Preferred, percent | Range, percent | Preferred, percent |
| Protein | 0.5–10.0 | 1.5 | 0.7–25.0 | 2.5 | 1.0–30.0 | 3.0 |
| Carbohydrate | 5.0–40.0 | 20.0 | 8.0–85.0 | 40.0 | 15.0–95.0 | 54.5 |
| Refined fat | 2.0–30.0 | 13.0 | 3.0–65.0 | 26.0 | 3.0–85.0 | 36.0 |
| Stabilizer | 0.1–5.0 | 0.4 | 0.2–12.0 | 1.3 | 0.3–15.0 | 3.5 |
| Water | 50.0–80.0 | 65.0 | 10.0–60.0 | 30.2 | 0.1–15.0 | 4.0 |
| Minerals | | | 0.1–6.0 | | | |
| Flavoring | | | 0.1–10.0 | | | |

It should be noted that a mix containing between approximately 10 and 15 per cent water may be either in the concentrate or dry form. This difference is dependent upon the method of manufacturing the same, which results in a somewhat different physical state within the mix.

In forming mixes in accordance with the concentrations given in the above table, there should exist a definite relationship between the concentration of the stabilizer relative to the concentration of the fat being employed. It has been found preferable to increase the concentration of the stabilizer relative to the concentrations of the other active ingredients as the forms of the mix are varied from the liquid toward the dry form.

In general, the aerated dessert product of the present invention should have between 2–25 per cent by weight of stabilizer relative to the weight of the fat, such as hydrogenated cottonseed oil or hydrogenated soy bean oil.

In manufacturing the liquid form, the concentration of the stabilizer should be between 2.0 and 10% of the concentration of the fat, such as pure refined hydrogenated cottonseed oil, particularly if the mix is likely to be kept on hand for a considerable period of time such as several days. However, where the liquid is to be whipped and used within a relatively short period of time, the upper limit could be increased up to approximately 25%. Likewise, the lower limit may be reduced to approximately 0.1%, but this reduction also effects a substantially proportionate reduction in the effectiveness of the stabilizer. It is preferred to use approximately 3% of the stabilizer relative to the weight of the fat.

When manufacturing the concentrate form, the percentage of stabilizer relative to the weight of fat, such as pure hydrogenated soy bean oil, is preferably 3–15%. When manufacturing the dry form, the percentage of the stabilizer relative to the weight of the fat, such as pure hydrogenated cottonseed oil, is preferably between about 4–25%. These limits may also be raised and lowered somewhat as in the case of the liquid discussed above.

The mixed partial glyceride product referred to can be either of two types, or a mixture of two types, the monoglyceride and the diglyceride. The monoglyceride may be represented by the type formula:

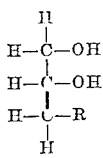

in which R represents one of a mixture of fatty acid residues derived from an edible oil or fat.

The diglyceride may be represented by the type formula:

in which R represents one of a mixture of fatty acid residues derived from an edible oil or fat.

Partial glycerides, or synthetic fats, of these types, and the reactions by which they can be prepared are well known and described in organic chemistry. To illustrate, glycerine and fat can be made to react at two hundred forty degrees C. to two hundred fifty degrees C. (240–250° C.), with a fraction of one per cent of soap as catalyst, and agitation to insure intimate contact of the reactants. The metathetical reaction is usually complete in fifteen minutes to thirty minutes. The molar proportions of glycerine to fat are two-to-one (2:1), one-to-one (1:1), or one-to-two (1:2), respectively, according to whether the monoglyceride, a mixture of the monoglyceride and the diglyceride, or the diglyceride is desired. A typical reaction of this type can be represented thus:

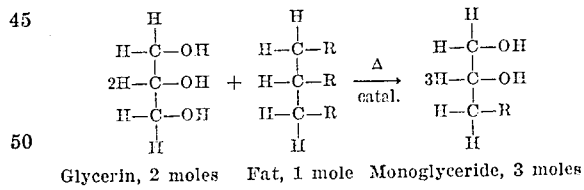

Glycerin, 2 moles    Fat, 1 mole    Monoglyceride, 3 moles

The mixed partial glyceride resultant can be deflavored for food use by the usual method of blowing steam through it under a vacuum.

Such a mixed partial glyceride product differs in chemical nature from an ordinary unmixed partial glyceride such as glyceryl monostearate, glyceryl dilaurate, or glyceryl mono-oleate in the diversity of its fatty acid groups. I have found, and it can readily be shown, that this mixed partial glyceride produces characteristics and properties in a dessert mix emulsion which cannot be obtained with any one of the single-ester partial glycerides, and that for the purpose of this invention, single-ester partial glycerides such as glyceryl monostearate, are not equivalent to the partial glyceride product described, made from glycerin and a whole edible oil or fat.

In achieving the objects of my invention, I employ this partial glyceride product, which may properly be termed a "lipophilic additive," first to produce a compound emulsion which is both of the oil-in-water type and of the water-in-oil type; and secondly, to bring about a partial reversal of phases in the emulsion during aeration and chilling.

An essential step in forming my emulsion is dissolving the lipophilic additive in the melted fat phase of the emulsion, before the two phases are dispersed by homogenization. Each globule of fat in the final emulsion thus has its quota of lipophilic additive dissolved in it. If the oil-soluble lipophilic additive is added to the emulsion after the phases have been dispersed, it has almost no phase-reversing effect.

As the emulsion emerges from the homogenizer, it is a simple oil-in-water emulsion. Immediately upon removal of agitation, however, as the emulsion is allowed to stand, either at room temperature or refrigerated at 30–40° F., the lipophilic additive begins to transform this simple emulsion into a compound emulsion of dual character, in which emulsions of both the oil-in-water type and the water-in-oil type are represented.

The molecular structure of the lipophilic additive or stabilizer is such that its micelle can be visualized as having at one end a large, fat-similar, lipophilic fragment, in which most of its molecular weight is concentrated, and a relatively smaller water-similar, or hydrophilic, fragment containing the hydroxyl groups. A strong attraction of the fat globules for one another is brought about by the presence in the fat of the lipophilic additive. As the globules collide occasionally under the well known Brownian movement of small particles in suspension, they form spherical or near-spherical aggregates, or enclosures, each aggregate having as its center a small portion of the aqueous phase of the emulsion. As two or more of these cells or enclosures occasionally collide to form larger groups of such enclosures, it is seen that a compound emulsion is formed, predominately of the oil-in-water type, but having within it small, discontinuous fragments of water-in-oil emulsion, represented by the minute enclosures and groups of enclosures, in which small portions of the aqueous phase are discontinuous and surrounded by cellular walls of cohering fat globules.

This process of formation of a compound emulsion is recognizable as the beginning of a phase reversal. The process proceeds more rapidly at room temperature than at refrigeration temperature, as might be expected, and approaches an equilibrium as the groups of enclosures become larger and heavier and their movement is impeded by frictional forces. In practice, immediately after its preparation, the emulsion is allowed to stand quietly a few hours at refrigeration temperature until this near-equilibrium has been reached, and the emulsion is said to have been "aged."

As the "aged" mix is whipped during chilling, myriads of collisions are brought about among the free globules of fat, and the enclosures and the fragments of enclosures which have already been formed. The mechanical agitation thus disturbs the near-equilibrium which previously existed between the oil-in-water and the water-in-oil portions of the compound emulsion, and as the globules and cellular aggregates of the fat phase collide, the strong attractive influence of the lipophilic additive causes them to cohere, without, however, coalescing in such a way as to break the emulsion, and the phases of the emulsion are thus reversed, the relatively small amount of fat forming a gel or lattice structure, of solid, continuous phase, enclosing a much larger amount of aqueous phase, as a small amount of honeycomb holds a large amount of honey.

During the whipping, air is ingested, and the emulsion's lattice of fat globules is forced to form around bubbles of air. An analogy would be a honeycomb full of very large holes, or bubbles. In whippable food emulsions of higher fat content intended to be used as substitutes for whipping cream (cf. applicant's United States Patent No. 2,487,698, issued November 8, 1949), this reversal of phases is for all practical purposes complete, and the whipped emulsion is of the water-in-oil type, reversed and "set up" around bubbles of air. Its aqueous phase is practically completely entrapped in the honeycomb cells of the lattice formed by the cohering globules of fat, and the walls of these cells are strengthened by the concentration, at their inner surface, of the somewhat elastic proteinaceous and other dissolved solids of the aqueous phase.

In the present invention, there is too little fat in the dessert mix emulsion to permit a complete reversal of phases. After aeration and freezing, the dessert mix is still a compound emulsion of dual character, with the difference that after whipping, freezing, and the accompanying partial phase reversal, a considerably greater mass of the mix exists as a water-in-oil type emulsion, and it is largely this part of the emulsion which retains the air ingested during whipping. The emulsion structure obtained during the simultaneous whipping and chilling of the dessert mix may be compared with the structure of popcorn balls. In this analogy, the aerated grains of popcorn represent the reversed water-in-oil portion of the emulsion which retains the ingested air, and the caramel represents the portion of the emulsion which persists as a fluid, oil-in-water emulsion until it freezes.

Notwithstanding that this phase reversal is only partial, I have found that the behavior of the dessert mix during aeration and freezing is directly dependent upon it, and that by controlling the phase reversal through the use of definite and specific amounts of lipophilic additive, I can control the behavior of the mix. For example, too little lipophilic additive results in insufficient attraction among the fat globules to permit the formation of a stable lattice of cohering globules of solid fat which retains ingested air, and poor "overrun" is obtained. At the other extreme, an excess of lipophilic additive brings about an excessive attraction among the fat globules which causes them to coalesce prematurely, and churn out during whipping and freezing, producing an excessively greasy frozen dessert, with poor overrun.

The word "stabilizer" has been given many definitions and usages. For example, the stabilizer of ice cream mix is generally gelatin, or a similar substance which thickens the mix. Gums are used in a similar way in certain emulsions to aid in maintaining the discontinuous phase in a dispersed condition. Various stabilizers are used in shortening to prevent the development of rancidity, and so on.

The lipophilic additive can be termed a stabilizer. It stabilizes, holds, and maintains the emulsion of the present invention in a compound form of dual character, in such a state of equilibrium that a reversal of phases within the emulsion is readily effected.

The term "near equilibrium" as used in the present application means a condition of the emulsion in which the phases are present in both the oil-in-water type and the water-in-oil type and in which these phases are, for all practical purposes, in equilibrium. While the phases still tend to reverse, this reversal at relatively low temperature is so slow that the composition will remain in this dual character for several days before a complete reversal results. Thus, the composition may remain on a store shelf or the like for relatively long periods and still maintain its dual character and also still be easily and quickly reversed by subsequent agitation. This very slow continuous reversal is due undoubtedly to the movement of the particles in accordance with the well known Brownian theory and is quickened substantially by either higher temperatures or by mechanical agitation since they both increase the movement of the particles.

The following examples are given which illustrate compositions of the liquid mix embodying the features of the present invention.

*Example I*

| | Per cent by weight |
|---|---|
| Neutral sodium proteinate of soy protein | 0.5–10.0 |
| Dextrose (0.1–36.0) <br> Sucrose (0.1–30.0) | 5.0–40.0 |
| Hydrogenated cottonseed oil | 2.0–30.0 |
| Stabilizer | 0.1– 5.0 |
| Water | 50.0–80.0 |

*Example II*

| | Per cent by weight |
|---|---|
| Neutral sodium proteinate of soy protein | 1.5 |
| Dextrose | 5.0 |
| Sucrose | 15.0 |
| Pure hydrogenated soy bean oil | 13.0 |
| Stabilizer | 0.5 |
| Water | 65.0 |

*Example III*

| | Per cent by weight |
|---|---|
| Neutral sodium proteinate of soy protein | 1.5 |
| Dextrose | 5.0 |
| Sucrose | 15.0 |
| Hydrogenated cottonseed oil | 13.0 |
| Stabilizer | 0.5 |
| Water | 65.0 |

A typical method for manufacturing a batch of the liquid food product of the present invention and particularly the food product of Example III is as follows: I place seventy-five (75) gallons of water heated to approximately 60° C. in a 150 gallon steam jacketed agitator tank. I then mix separately, in a dry powder mixer, thirty-five (35) pounds of spray-dried neutral sodium proteinate of soy protein, forty-eight (48) pounds of dextrose, one-hundred-fifty (150) pounds of sucrose, two (2) pounds of salt, four (4) ounces of colloidal tricalcium phosphate, and ten (10) grams of a water soluble vitamin mixture of powdered sugar, riboflavin, thiamine hydrochloride and niacin. I add this dry mix to the hot water gradually with agitation, to complete the aqueous phase of my emulsion. I then discontinue agitation of the aqueous phase and add to the material in the agitator one-hundred-twenty-nine (129) pounds of pure hydrogenated oil, which is a solid at room temperature. Steam is admitted into the jacket in sufficient amounts to raise the temperature to the melting point of the vegetable fat which is thereby melted and forms a layer on top of the aqueous mixture in the tank. Into the fat layer I then add four (4) pounds of melted mixed partial glyceride product of the metathetical reaction of glycerin and hydrogenated cottonseed oil, six (6) grams of U. S. Certified butter color, one-half (½) ounce of an oil-soluble concentrate of vitamins A and D, and one-fourth (¼) ounce of oil-soluble imitation cream flavor and stir without appreciable mixing of the fat and water layers in the tank. I then resume agitation of the mix, raise its temperature to 75° C., and homogenize the mix through a pressure-type, two-stage homogenizer at 2500 pounds per square inch pressure at the first stage, and 500 pounds per square inch at the second stage. I then homogenize the mix a second time through the same machine, dispensing with the use of the first-stage valve entirely, and adjusting the second-stage valve so as to maintain an homogenization pressure of 250 pounds per square inch. I then pass the mix over a conventional dairy type cooler to lower its temperature to 35° F., package it preferably in cans of five gallons capacity, and place it under refrigeration at 30°–40° F. where it is held until used. Such a product is particularly designed for commercial manufacture of the frozen dessert.

A concentrate form of the mix particularly designed for the individual consumer is made by reducing the water content of the emulsion. Such a concentrate can be prepared to have the required "shelf life" to permit its sale from grocery counters or the like without storage under refrigeration by so adjusting its sugar content that it is high enough to inhibit bacterial growth in the concentrate. The following are typical examples of this concentrate form of the mix.

*Example IV*

| | Per cent by weight |
|---|---|
| Casein | 0.7–25.0 |
| Sucrose (0.1–45.0) <br> Lactose (0.1–40.0) | 8.0–85.0 |
| Pure hydrogenated cottonseed oil | 3.0–65.0 |
| Stabilizer | 0.2–12.0 |
| Flavoring | 0.1–10.0 |
| Minerals | 0.1– 6.0 |
| Water | 10.0–60.0 |

*Example V*

| | Per cent by weight |
|---|---|
| Neutral sodium proteinate of peanut protein | 2.5 |
| Commercial glucose | 10.0 |
| Sucrose | 30.0 |
| Hydrogenated cottonseed oil | 26.0 |
| Stabilizer | 1.3 |
| Water | 30.2 |

*Example VI*

| | Per cent by weight |
|---|---|
| Neutral sodium proteinate of soy protein | 2.5 |
| Dextrose | 10.0 |
| Sucrose | 30.0 |
| Hydrogenated cottonseed oil | 26.0 |
| Stabilizer | 1.3 |
| Water | 30.2 |

The above examples may be compounded in accordance with the method of Example III, but using a sufficient weight of the various ingredients to produce the specific percentage compositions disclosed above. In forming the composition of Example VI, the same weights of the dextrose, sucrose and the hydrogenated cottonseed oil are employed. However, the weight of neutral sodium proteinate of soy protein is reduced from 35 pounds to 12.4 pounds, the water is reduced from 75 gallons to 18 gallons and the stabilizer is increased from 4 pounds to 6.5 pounds.

Before using the concentrate form of the food product, the mix is reconstituted with an equal volume of water and then whipped, aerated and frozen.

The spray-dried form of the dessert mix is illustrated in the following examples.

*Example VII*

| | Per cent by weight |
|---|---|
| Casein | 1.0–30.0 |
| Sucrose (0.3–75.0) ⎫ Lactose (0.3–60.0) ⎭ | 15.0–95.0 |
| Hydrogenated cottonseed oil | 3.0–85.0 |
| Stabilizer | 0.3–15.0 |
| Water | 0.1–15.0 |

*Example VIII*

| | Per cent by weight |
|---|---|
| Neutral sodium proteinate of soy protein | 3.0 |
| Sucrose | 41.0 |
| Hydrogenated cottonseed oil | 36.0 |
| Stabilizer | 2.0 |
| Corn syrup solids | 14.0 |
| Water | 4.0 |

*Example IX*

| | Per cent by weight |
|---|---|
| Neutral sodium proteinate of soy protein | 3.0 |
| Dextrose | 18.0 |
| Sucrose | 36.5 |
| Hydrogenated soy bean oil | 36.0 |
| Stabilizer | 3.5 |
| Water | 4.0 |

In preparing the spray-dried compositions above, the same procedure is followed as is described in connection with Example III. In preparing the composition of Example IX, the weight of neutral sodium proteinate of soy protein is reduced from 35 pounds to 11 pounds, the water is reduced somewhat and the stabilizer is increased from 4 pounds to 12.7 pounds. The resulting emulsion is then dried to the desired water content in a conventional spray-drying unit. Before using, the mix is reconstituted with water and then whipped, aerated and frozen.

The emulsions should be prepared at all times at temperatures above the melting point of the fat component, but below the temperature at which coagulation of the protein or degradation of the other ingredients might occur. This temperature range varies somewhat with the ingredients used, but has been found to be generally in the range from approximately 50° C. to approximately 85° C. Low pressures of less than 500 pounds per square inch are suitable, but high homogenization pressures in the neighborhood of 2500–3500 pounds per square inch can be used to obtain very fine particle size and smooth texture in the finished mix, providing a second and final homogenization is effected at a pressure below 500 pounds per square inch. It has been shown that at high homogenization pressures, practically all the fat emerges from the homogenizer in the form of solid aggregates, or clumps, of fat globules. For the purpose of this invention, these clumps must be broken up by a second homogenization at lower pressure, or by some special device, to permit the globules of fat, under the influence of the lipophilic additive and the Brownian movement, to form the cellular enclosures herein described.

For the purpose of my invention, neutral soy protein (sometimes known as neutral sodium proteinate of soy protein), neutral peanut protein, and in general, all other edible and neutral, water soluble proteins of either animal or vegetable origin, which are purified to the extent that they do not have associated with them contaminants which would interfere with the behavior of the emulsion, are suitable. Skim milk, or skim milk powder can be used, since the foreign materials generally found associated with milk casein in this form do not interfere with the behavior of the emulsion.

The function of the protein in the emulsion is that of a combined foaming and bodying agent, its concentration at the interface of the emulsion serving to strengthen the walls of the fat-globule lattice when the phases of the emulsion are reversed. An insufficient amount of protein gives inadequate support to the lattice walls of fat, permitting the emulsion to "weep" excessively after freezing and phase reversal, during "meltdown" by collapse of the cells. An excess of proteinaceous materials in the emulsion has the effect of causing the emulsion to be excessively viscous and difficult to aerate, so that a gummy frozen dessert with insufficient overrun is produced.

When using modified proteins, such as the product of enzymatic degradation of proteins, it is normally necessary to employ an additional thickening or bodying agent, such as dextrins or soluble cellulose derivations. In using such modified proteins, the concentration thereof may be reduced somewhat relative to the equivalent concentration of the neutral alkali proteinate. The lower limit of the latter compound should be approximately 0.7% of the total weight of the mix or emulsion whereas, in using the modified protein, the concentration may be reduced to approximately 0.5%.

Fats, suitable for the purpose of my invention, are pure edible mixtures of complete glycerides which are solid at room temperature, and which are free from modifying reagents often used in commercial shortenings, particularly of the high ratio type, such as free fatty acids, lecithin, soap, polyglycerol esters, glyceryl esters, glycol esters, and synthetic blends of these and other modifying materials, for the presence of such materials defeats the purpose of my invention. Fats that are suitable include pure hydrogenated vegetable oils, pure refined lard, and other refined fats. Butterfat is suitable if it is first subjected to the same refining and purifying processes as are applied to vegetable oils, although such a procedure is at present not economically feasible.

Carbohydrates suitable for the purpose of my invention are dextrose, commercial glucose, corn syrup solids, sucrose, lactose, sorbitol, mannitol; and in general, all other edible, nutritious, water soluble and neutral carbohydrate materials. The concentration of the carbohydrates in the mix is not critical in regard to the final characteristics in the emulsion but merely varies the sweetness of the final product.

An advantage of my invention is that it makes possible the utilization of nutritious, low-cost food materials, such as vegetable proteins and fats, in a dessert mix which aerates and freezes with a body and texture equal to those of the finest ice creams.

Another advantage of this invention is that it provides a food containing essential nutriments in itself and as well as an additional substance, the lipophilic additive or stabilizer, itself a food, which provides a means for precise control of the physical characteristics of the finished product.

Another advantage of this invention is that it makes possible the preparation of a spray-dried dessert mix which can be used immediately after it is reconstituted, without the customary aging and which may be aerated and frozen to produce an aerated dessert product having excellent overrun, body, and texture.

A further, and principal advantage of my invention is that it makes possible the preparation of a dessert mix in liquid, dried, or concentrate form, with flexible yet predictable, controllable, and predetermined uniform whipping, aerating and freezing characteristics.

Having thus described my invention and how it is made, what I claim as new and desire to secure by United States Letters Patent is:

1. A liquid dessert mix consisting of an emulsion in near equilibrium between an oil-in-water type and a water-in-oil type and adapted to incorporate and hold a predetermined quantity of air when whipped and frozen and comprising in approximate percentages by weight from 0.5% to 10.0% of edible, neutral, water soluble protein, from 5.0% to 40.0% of edible carbohydrate, 2.0% to 30.0% of pure refined fat, and 0.1% to 5.0% of a stabilizer comprising the mixed partial glyceride reaction product of the metathetical reaction of glycerin and a pure refined edible fat, and water in sufficient amounts to provide the balance of 100%, the weight of said stabilizer being approximately equivalent to 2–10 per cent of the weight of said pure refined fat.

2. A liquid dessert mix consisting of an emulsion in near equilibrium between an oil-in-water type and a water-in-oil type and adapted to incorporate and hold a predetermined quantity of air when whipped and frozen and comprising in approximate percentages by weight 1.5% of edible, neutral, water soluble protein, 20.0% of edible carbohydrate, 13.0% of pure refined fat and 0.4% of a stabilizer comprising the mixed partial glyceride reaction product of the metathetical reaction of glycerin and a pure refined edible fat, and water in sufficient amount to provide the balance of 100%.

3. A liquid dessert mix consisting of an emulsion in equilibrium between an oil-in-water type and a water-in-oil type and adapted to incorporate and hold a predetermined quantity of air when whipped and frozen and comprising in approximate percentages by weight from 0.5% to 10.0% of neutral sodium proteinate of soy protein; from 5.0% to 40.0% of edible carbohydrate including from 0.1% to 35.0% of dextrose and from 0.1% to 30.0% of sucrose; 2.0% to 30.0% of pure refined hydrogenated cottonseed oil; and 0.1% to 5.0% of a stabilizer comprising the mixed partial glyceride reaction product of the metathetical reaction of glycerin and pure hydrogenated cottonseed oil, and 50.0% to 80.0% of water in proportions one to another sufficient to make 100%, the weight of the stabilizer being approximately equivalent to 2–10 per cent of the weight of said pure refined hydrogenated cottonseed oil and the neutral sodium proteinate of soy protein having a weight equivalent to at least 0.5 per cent of the total weight of the mix.

4. A liquid dessert mix consisting of an emulsion in near equilibrium between an oil-in-water type and a water-in-oil type and adapted to incorporate and hold a predetermined quantity of air when whipped and frozen and comprising in approximate percentages by weight 1.5% of neutral sodium proteinate of soy protein, 5.0% of dextrose, 15.0% of sucrose, 13.0% of pure hydrogenated soy bean oil, and 0.5% of a stabilizer comprising the mixed partial glyceride reaction product of the metathetical reaction of glycerin and pure hydrogenated cottonseed oil, and water in sufficient amount to provide the balance of 100%.

5. A liquid dessert mix as claimed in claim 4 and further characterized in that the ingredients are mixed to form an emulsion predominately of the oil-in-water type.

6. A method of manufacturing a liquid dessert mix having predetermined performance characteristics which consists in emulsifying approximately 0.5% to 10.0% by weight of edible, neutral, water soluble protein, approximately 5.0% to 40.0% by weight of edible carbohydrate, approximately 2.0% to 30.0% by weight of pure refined fat, and 0.1% to 5.0% by weight of a mixed partial glyceride stabilizing agent produced by the metathetical reaction of glycerin and a pure refined fat, and water in an amount sufficient to constitute 100%, the weight of said stabilizer being approximately equivalent to 2–10 per cent of the weight of said pure refined fat, said mixture comprising an emulsion of fluid consistency in near equilibrium between a water-in-oil type and an oil-in-water type and predominately the oil-in-water type whose volume may be increased on whipping and freezing by the incorporation and retention of air therein.

7. A dessert mix in concentrate form consisting of an emulsion in near equilibrium between an oil-in-water type and a water-in-oil type and adapted to be diluted to incorporate and hold a predetermined quantity of air when whipped and frozen and comprising in approximate percentages by weight 0.7% to 25.0% of edible, neutral, water soluble protein, 8.0% to 85.0% of edible carbohydrate, 3.0% to 65.0% of pure refined fat, and 0.2% to 12.0% of a stabilizer comprising the mixed partial glyceride reaction product of the metathetical reaction of glycerin and a pure refined edible fat, and 10.0% to 60.0% of water in proportions one to another sufficient to make 100%, the weight of said stabilizer being approximately equivalent to between about 3–15 per cent of the weight of said pure refined fat.

8. A dessert mix in concentrate form consisting of an emulsion in near equilibrium between an oil-in-water type and a water-in-oil type and adapted to be diluted to incorporate and hold a predetermined quantity of air when whipped and frozen and comprising in approximate percentages by weight 2.5% of edible, neutral, water soluble protein, 40.0% of edible carbohydrate, 26.0% of pure refined fat, and 1.3% of a stabilizer comprising the mixed partial glyceride reaction product of the metathetical reaction of glycerin and a pure refined edible fat, and water in sufficient amount to provide the balance of 100%.

9. A dessert mix in concentrate form consisting of an emulsion in near equilibrium between an oil-in-water type and a water-in-oil type and adapted to be diluted to incorporate and hold a predetermined quantity of air when whipped and frozen and comprising in approximate percentages by weight 0.7% to 25.0% of casein; 8.0% to 85.0% of carbohydrate including 0.1% to 40.0% of lactose and 0.1% to 45.0% of sucrose; 3.0% to 65.0% of pure hydrogenated soy bean oil; and 0.2% to 12.0% of a stabilizer comprising the mixed partial glyceride reaction product of the metathetical reaction of glycerin and pure hydrogenated cottonseed oil, and 10.0% to 60.0% of water, 0.1% to 6.0% of minerals, and 0.1% to 10.0% of flavoring materials in proportions one to another sufficient to make 100%, the weight of said stabilizer being approximately equivalent to between about 3–15 per cent of the weight of the pure hydrogenated soy bean oil.

10. A dessert mix in concentrate form consisting of an emulsion in near equilibrium between an oil-in-water type and a water-in-oil type and adapted to be diluted to incorporate and hold a predetermined quantity of air when whipped and frozen and comprising in approximate percentages in weight of 2.5% of neutral sodium proteinate of peanut protein, 10.0% of commercial glucose, 30.0% of sucrose, and 26.0% of pure hydrogenated cottonseed oil, and 1.3% of a stabilizer comprising the mixed partial glyceride reaction product of the metathetical reaction of glycerin and pure hydrogenated cottonseed oil, and water in sufficient amount to provide the balance of 100%.

11. A dessert mix in concentrate form as claimed in claim 10 and further characterized in that the ingredients are mixed to form an emulsion predominately of the oil-in-water type.

12. A method of manufacturing a dessert mix in concentrate form adapted to be diluted to incorporate and hold a predetermined quantity of air when whipped and frozen which consists in emulsifying approximately 0.7% to 25.0% by weight of edible, neutral, water soluble protein, approximately 8.0% to 85.0% by weight of edible carbohydrate, approximately 3.0% to 65.0% by weight of pure refined edible fat, approximately 0.2% to 12.0% by weight of a mixed partial glyceride stabilizing agent produced by the metathetical reaction of glycerin and a pure refined edible fat, and 10.0% to 60.0% by weight of water in proportions one to another sufficient to constitute 100%, the weight of said stabilizer being approximately equal to 3–15 per cent of the weight of said pure refined edible fat, said mixture comprising an emulsion of heavy consistency in near equilibrium between a water-in-oil and an oil-in-water type and predominately of the oil-in-water type whose volume may be increased on whipping and freezing by incorporation and retention of air therein.

13. A dessert mix in dried form adapted to be reconstituted with water to incorporate and hold a predetermined quantity of air when whipped and frozen and to form an emulsion in near equilibrium between an oil-in-water type and water-in-oil type, and comprising in approximate percentages by weight from 1.0% to 30.0% of edible, neutral, water soluble protein, 15.0% to 95.0% of edible carbohydrate, 3.0% to 85.0% of pure refined fat, and 0.3% to 15.0% of a stabilizer comprising the mixed partial glyceride reaction product of the metathetical reaction of glycerin and a pure refined edible fat and 0.1% to 15.0% residual moisture in proportion one to another sufficient to make 100%, the weight of said stabilizer being approximately equivalent to between about 4–25 per cent of the weight of said pure refined fat.

14. A dessert mix in dried form adapted to be reconstituted with water to incorporate and hold a predetermined quantity of air when whipped and frozen and to form an emulsion in near equilibrium between an oil-in-water type and a water-in-oil type, and comprising in approximate percentages by weight 3.0% of edible, neutral, water soluble protein, 54.5% of edible carbohydrate, 36.0% of pure refined fat, and 3.5% of a stabilizer comprising the mixed partial glyceride reaction product of the metathetical reaction of glycerin and a pure refined edible fat, and 4.0% of residual moisture.

15. A dessert mix in dried form adapted to be reconstituted with water to incorporate and hold a predetermined quantity of air when whipped and frozen and to form an emulsion in near equilibrium between an oil-in-water type and a water-in oil type, and comprising in approximate percentages by weight from 1.0% to 30.0% of casein; 15.0% to 95.0% of edible carbohydrate including 0.3% to 60.0% lactose, and 0.3% to 75.0% of sucrose; 3.0% to 85.0% of pure hydrogenated cottonseed oil; and 0.3% to 15.0% of a stabilizer comprising the mixed partial glyceride reaction product of the metathetical reaction of glycerin and pure hydrogenated cottonseed oil, and 0.1% to 15.0% of residual moisture in proportions one to another sufficient to make 100%, the weight of the stabilizer being approximately equivalent to between about 4–25 per cent of the weight of said pure hydrogenated cottonseed oil.

16. A dessert mix in dried form adapted to be reconstituted with water to incorporate and hold a predetermined quantity of air when whipped and frozen and to form an emulsion in near equilibrium between an oil-in-water type and a water-in-oil type, and comprising in approximate percentages by weight 3.0% of neutral sodium proteinate of soy protein, 14.0% of corn syrup solids, 41.0% of sucrose, 36.0% of pure hydrogenated soy bean oil, 2.0% of a stabilizer comprising the mixed partial glyceride reaction product of the metathetical reaction of glycerin and pure hydrogenated cottonseed oil and 4.0% of residual moisture.

HOLTON W. DIAMOND.

REFERENCES CITED

The following references are of record in the file of this patent:

UNITED STATES PATENTS

| Number | Name | Date |
|---|---|---|
| 2,487,698 | Diamond | Nov. 8, 1949 |